United States Patent [19]

Matalon

[11] 4,265,963

[45] May 5, 1981

[54] FLAMEPROOF AND FIREPROOF PRODUCTS CONTAINING MONOETHANOLAMINE, DIETHYLAMINE OR MORPHOLINE

[75] Inventor: Ralph Matalon, Cherry Hill, N.J.

[73] Assignee: Arco Polymers, Inc., Philadelphia, Pa.

[21] Appl. No.: 108,591

[22] Filed: Dec. 31, 1979

Related U.S. Application Data

[63] Continuation-in-part of Ser. No. 6,728, Jan. 26, 1979, abandoned, which is a continuation of Ser. No. 871,959, Jan. 24, 1978, abandoned, which is a continuation of Ser. No. 755,596, Dec. 30, 1976, abandoned.

[51] Int. Cl.³ .................................................. B27K 3/00
[52] U.S. Cl. ..................................... 428/288; 428/290; 428/310; 428/315; 428/411; 428/455; 428/500; 428/521; 428/523; 428/524; 428/920; 428/921; 521/72; 521/85; 521/88
[58] Field of Search ............... 428/310, 315, 411, 920, 428/921, 538, 288, 290, 455, 500, 521, 523, 524; 252/8.1

[56] References Cited

U.S. PATENT DOCUMENTS

| | | | |
|---|---|---|---|
| 3,551,365 | 12/1970 | Matalon | 260/17.2 |
| 3,808,159 | 4/1974 | Matalon | 260/2.5 AM |
| 3,824,200 | 7/1974 | Matalon | 260/2.5 R |
| 3,973,074 | 8/1976 | de Lissa | 428/537 |

*Primary Examiner*—Marion McCamish

[57] ABSTRACT

Flameproof and fireproof products are formed from a fire-unstable material coated with a polymeric material which is capable of intumescing beginning at a low temperature and has adhesive qualities in conjunction with the fire-unstable material. Upon the application of heat or flame to the products, the coating material copiously intumesces to form a protective thermal insulating foam barrier which prevents the fire-unstable material from igniting or degrading to the point of evolving flammable gases or losing its dimensional stability. Continued application of heat or flame will cause the foam to char but will not destroy the products for a surprisingly long time. The polymeric coating material comprises the resinous reaction product of phosphoric acid and a reducing sugar with a hardener and containing at least one modifying agent capable of rendering the coating material highly and permanently intumescent at a low initiating temperature even after prolonged storage of the flameproof and fireproof product. The modifying agent may be monoethanolamine, diethylamine, morpholine or mixtures thereof.

28 Claims, No Drawings

FLAMEPROOF AND FIREPROOF PRODUCTS CONTAINING MONOETHANOLAMINE, DIETHYLAMINE OR MORPHOLINE

This application is a continuation-in-part application of U.S. application Ser. No. 6,728, filed Jan. 26, 1979 now abandoned, which in turn is a continuation application of U.S. application Ser. No. 871,959, filed Jan. 24, 1978 (now abandoned) which in turn is a continuation application of U.S. application Ser. No. 755,596, filed Dec. 30, 1976 (now abandoned).

The present invention relates to flameproof and fireproof products.

A wide variety of materials used heretofore as materials of construction are fire-unstable, i.e., they burn or melt or otherwise heat-degrade to the point of evolving flammable volatile gases or losing their dimensional stability when in contact with flame or heat. Such fire-unstable materials of construction, whether in the form of discrete regular or irregular particles or in the form of sheets or boards or laminates, such as polymeric materials, expanded polystyrene beadboard, polyurethane foam, cork, wood particle board and glass fiber batting, have therefore had to be protected against fire by means of thermal barriers.

Expanded polystyrene beadboard is a material of construction which has proven to be particularly difficult to protect against fire due to its low glass transition or softening point temperature, e.g., about 100° C. for polystyrene having a molecular weight equal to or greater than about 50,000. The previous attempts to improve the performance of expanded polystyrene beadboard under fire using either selfextinguishing or flame retardant additives have been inadequate. The so-called chemical flame retardants using halogens, peroxides, phosphorous and/or metallic oxides, such as antimony trioxide and molybdenum trioxide, did nothing to reduce the thermoplasticity of the polystyrene upon exposure to flame and very little to raise the flame resistance. Similarly, the precoating of the polystyrene beads prior to molding with thermoplastic resins or thermosetting foamed resins have been unsuccessful in effectively reducing the flammability of the polystyrene products. The most that can be said of the prior art additives is that they can be self-extinguishing agents, namely, that when the flame is taken away from the exposed polystyrene the flame extinguishes. Because of this, the present fire regulations impose the use over the polystyrene insulation product of a half inch thick portland cement plaster or gypsum board which increases the safety factor in the event of fire by retarding the smoke evolution and reducing flame propagation.

It is, therefore, the principal object of the present invention to render fire-unstable materials, particularly polystyrene, flameproof and fireproof to a degree not heretofore obtainable with the presently proposed selfextinguishing and flame-retardant additives. A further object is to provide flameproof and fireproof products.

In accordance with the present invention, flameproof and fireproof products are provided which comprise (a) a fire-unstable material and (b) a unique coating composition. The fire-unstable material, as noted above, is a material which, usually within a temperature range, burns or melts or otherwise heat-degrades to the point of evolving flammable volatile gases or losing its dimensional stability when in contact with flame or heat. Such fire-unstable materials include, particularly, polymeric materials, polystyrene beads and foam, and also polyurethane foam, cork, wood particles, glass fibers and similar materials of construction. Other fire-unstable materials include natural or foamed thermoplastic materials or synthetic thermoplastic materials, such as polyethylene, polyvinylchloride, copolymers of styrene and ethylene, etc. The fire-unstable material can be in the form of discrete particles of regular, irregular or fibrous shape or in the form of sheets or boards or laminates. The invention may also be applied to those materials considered fire-stable, e.g., steel, aluminum, and other metals and alloys.

The coating composition or coating material, prior to hardening, can be applied to the fire-unstable material as a coating or matrix for particulate material or as a coating and matrix for sheet or particle board material or as a coating, matrix and laminating adhesive layer in the formation of laminates from two or more identical or dissimilar sheets or boards.

The hardened coating material used in the flameproof and fireproof products of the invention has a unique set of properties. Thus, the hardened coating material is capable of intumescing (after softening and flowing) beginning at a low temperature which is appreciably below the incipient temperature of intumescence of the heretofore known fire-retardant intumescent coatings and is at or below about the maximum of the temperature range at which the fire-unstable material degrades to the point of evolving flammable gases or losing its dimensional stability. Thus, upon application of flame or heat, the coating material copiously intumesces to form a thermal insulating foam barrier having a low foam density of from about 0.2 to about 2 pounds per cubic foot and a generally closed, finely divided cell structure upon the fire-unstable material. Upon continued exposure to heat or flame for an appreciable time, the thermal insulating foam barrier will become a porour char or residue. The porous char or residue is nonflammable, has adequate insulation strength and flame resistane to prevent flaming and the usual heat-degradation of the fire-unstable material so that the fire-unstable material does not heat-degrade for a prolonged period of time to the point of evolving flammable volatile gases or losing its dimensional stability. The low temperature intumescence and thermal barrier insulating characteristics of the coating material, therefore, protect the coated fire-unstable material, including even polystyrene foam.

In contrast to prior definitions of "intumescent" in which the foaming and charring of the intumescent material were considered simultaneous, the term "intumescent" in the present invention means the formation of a protective insulating foam. The foam appears as a stable, heat-resistant, coherent entity which is nonflammable and has strength enough to be significantly resistant to further heat or flame. It is sometimes yellow or orange in color and does not char and turn black except on continued or sustained exposure to high heat or flame.

The start of intumescence of the coating material was measured by a Thermomechanical Analyzer which permits visual and temperature readings for the dimensional and viscoelastic changes in a solid-state sample heated in a standard furnace. Temperature programming of the instrument is provided. In tests on various coating materials embodying the present invention at a programmed temperature increase of 10° C. per minute, intumescence started as low as about 75° C. and as high as about 150° C., although softening and slight flow of the coating was noticed at temperatures in the approximate range of about 20° C. to about 70° C. which is considerably below the temperature at which intumescence started. Most of the samples tested started intumescing in the range of 100° C.–120° C. and when intumescence did not initiate until about 140° C.–150° C., the amount of intumescence was reduced. Commercially available fire-retardant intumescent coatings, on the other hand, showed a start of intumescence at higher temperatures of 160° C. to 260° C. when tested in the same manner.

The coating material generally is present on the fire-unstable material in a weight ratio of from about 0.04:1 to about 4:1, usually in a weight ratio of from about 0.4:1 to about 2:1 and frequently in a weight ratio of about 1:1. As a general rule, the higher the weight ratio of the coating material to the fire-unstable material, the greater the flameproofing and fireproofing. Cost factors may impose a limitation on this weight ratio.

The hardened coating material comprises the resinous reaction product of (a) a liquid resin former with (b) a liquid hardener and containing (c) at least one generally liquid modifying agent. The liquid resin former is reacted with the liquid hardener in a weight ratio of from about 1:10 to about 10:1, preferably in a weight ratio of from about 1:2 to about 6:1, and most preferably in a weight ratio of about 1:1. The generally liquid modifying agent is used in a weight ratio to the liquid resin former plus liquid hardener of from about 0.005:1 to about 4:1, usually from about 0.02:1 to about 4:1 and preferably about 1:1 or about 2:1. The modifying agent may be incorporated with the resin former or the hardener, or most desirably added as a third ingredient of the coating material. The hardening reaction takes place at ambient temperature (or above to decrease reaction time) when the coating material is self-hardening and is effectuated at slightly elevated temperatures when the coating material is heat-hardenable.

Desirable liquid resin formers are disclosed in my U.S. Pat. Nos. 3,551,365, 3,808,159 and 3,824,200 and comprise the liquid polymeric product of a heated blend of ($a_1$) from about 25% to about 80% by weight, and preferably from about 37% to about 78% by weight, of a reducing sugar, ($a_2$) from about 5% to about 62% by weight, and preferably from about 15% to about 45% by weight, of 85% strength phosphoric acid, ($a_3$) from about 2% to about 20% by weight, and preferably from about 4% to about 15% by weight, of at least one fluidifier and ($a_4$) from 0% to about 15% by weight, and preferably from about 1% to about 4% by weight, of a polyhydric phenol having at least two hydroxy groups in a meta position. Representative examples of suitable reducing sugars include monosaccharides and disaccharides, such as dextrose and commercial glucose produced by hydrolysis of carbohydrates, fructose, galactose, mannose, lactose, and the like, and their blends with higher saccharides such as found in corn syrup, starch and flour, with dextrose being preferred. Cane sugar or sucrose, however, cannot be used because it is nonreducing sugar. The phosphoric acid is generally of 85% strength, although lower strength phosphoric acid can be used, provided compensation is made by a reduction of the free water present in the reaction mixture when water serves as a fluidifier of the reaction mixture. Suitable fluidifiers include water and/or dihydric or polyhydric lower aliphatic alcohols, such as ethylene glycol, propylene glycol, butylene glycol, diethylene glycol, glycerol and the like. The preferred fluidifier is water, because the presence of the dihydric or polyhydric aliphatic alochols may tend to produce a flammable atmosphere and increase surface flash upon subjecting the hardened coating material to flame. Useful polyhydric phenols having at least two hydroxy groups in a meta position, which polyhydric phenols improve the hardness of the hardened coating material and its stability to moisture, include resorcinol, pyrogallol and phloroglucinol. The liquid resin former is a reducing sugar copolymer or terpolymer containing chemically bound repeating acidic phosphate groups or units therein and repeated phenolic groups or units, when the phenolic reactant is used in its preparation. Small amounts of modifying agent, such as monoethanolamine, diethylamine, morpholine, or the like, and/or supplemental gas generating additive, such as urea, ammonium phosphate, ammonium sulfate, oxalic acid and dicyandiamide, or the like, as discussed hereinafter, can also be incorporated into the liquid resin former.

The liquid resin former may be prepared by dissolving or dispersing the reducing sugar in the fluidifier, which generally is water. When the solution or dispersion is obtained, the polyhydric phenol, when used, is then added with stirring and this is followed by the addition of part or all of the phosphoric acid. The system is brought to the boil (or below the boil when heating under elevated pressure) and maintained at about 115° C. to 130° C. for a period of 5 to 20 minutes or longer. As the system is cooled, the addition of a modifying agent and/or a supplemental gas generating additive may be made, if desired, preferably at a temperature below their decomposition temperature, and generally at or below about 50° C. The system is cooled to ambient temperature with the further addition of any balance of phosphoric acid.

Representative examples of formulations used for preparing the liquid resin former (RF) are given in the following Table I:

TABLE I

| | Liquid Resin Former (RF) | | | | | | | | | | | | |
|---|---|---|---|---|---|---|---|---|---|---|---|---|---|
| | Percent by Weight (%) | | | | | | | | | | | | |
| Formulation No. (RF-) | 77 | 1 | 2 | 3 | 4 | 5 | 6 | 7 | 8 | 9 | 10 | 11 | 12 |
| Components: | | | | | | | | | | | | | |
| Phosphoric acid (85%) | 32% | 43 | 41 | 36 | 31 | 31 | 29 | 24 | 20 | 38.5 | 41 | 33 | 37.5 |
| Water | 2 | — | 3 | 5 | 6 | 4 | 6 | — | — | 2.9 | 3 | 5 | 2.5 |
| Diethylene glycol | — | 3 | — | — | — | — | — | — | — | — | — | — | — |
| Polyhydric phenol, e.g., resorcinol | — | — | — | — | 6 | — | — | — | — | — | — | 4 | — |
| Reducing sugar, e.g., dextrose or commercial glucose | 43 | 54 | 56 | — | 57 | 65 | 65 | 76 | 80 | 52.6 | — | 44 | 38 |
| Starch | — | — | — | — | — | — | — | — | — | — | 56 | — | — |
| Flour | — | — | — | 59 | — | — | — | — | — | — | — | — | — |

TABLE I-continued

| | Liquid Resin Former (RF) | | | | | | | | | | | | |
|---|---|---|---|---|---|---|---|---|---|---|---|---|
| | Percent by Weight (%) | | | | | | | | | | | | |
| Formulation No. (RF-) | 77 | 1 | 2 | 3 | 4 | 5 | 6 | 7 | 8 | 9 | 10 | 11 | 12 |
| Urea | 10 | — | — | — | — | — | — | — | — | 6 | — | 14 | 16 |
| Oxalic acid | 4 | — | — | — | — | — | — | — | — | — | — | — | 2 |
| Diammonium phosphate* | 8 | — | — | — | — | — | — | — | — | — | — | — | — |
| Monoethanolamine | 1 | — | — | — | — | — | — | — | — | — | — | — | 1 |

*Monoammonium phosphate

Any suitable hardener can be used in conjuction with the liquid resin former to prepare the reaction product therebetween so long as the hardener is capable of gradually hardening the liquid resin former at ambient temperature or at slightly elevated temperatures. The preferred hardener contains formaldehyde and particularly urea-formaldehyde compounds having a mole ratio of formaldehyde to urea of from about 1:1 to about 2:1. The hardener may be in the form of a mixture of materials which mixture may form polymers or blends of polymers. Typical examples of formaldehyde hardeners include formaldehyde and furfuryl alcohol; formaldehyde and urea; formaldehyde, urea and furfuryl alcohol; formaldehyde, urea and glucose; and formaldehyde, urea, furfuryl alcohol and glucose. In the above formaldehyde hardeners containing furfuryl alcohol and urea, the mole ratio of urea to furfuryl alcohol should be above about 1:1 and up the about 9:1, while in those hardeners containing glucose the mole ratio of urea to glucose should be from about 6:1 to about 2:1. In preparing such formaldehyde hardeners, there can be present caustic soda (sodium hydroxide), capric acid and fluidifiers, such as cyclohexanol, diethylene glycol, glycerol and hexylene glycol, and the desired amount of modifying agent, such as, monoethanolamine, diethylamine, morpholine, or the like. The formaldehyde used preferably is in the form of paraformaldehyde.

By way of example, the hardeners can be prepared according to one procedure by charging the reactor with the caustic soda (when used), water, alcoholic fluidifiers (when used), furfuryl alcohol (when used) and the paraformaldehyde; heat to 115° C.-120° C. for 10-30 minutes or until clear; cool to 85° C.-90° C. (where necessary); add the glucose (when used); heat to 115° C.-120° C. for 5-25 minutes or until clear; cool to 80° C.-85° C. (where necessary); add the urea; heat to 110° C.-120° C. for 20-25 minutes or until clear; add the capric acid (when used); heat to 115° C.-120° C. for about 10 minutes; cool, add the modifying agent (when used), and discharge the reactor. Alternatively, the hardeners may be prepared by charging the reactor with the water and glucose; add the urea to the above-formed aqueous solution of glucose; heat to 115° C.-120° C. for about 15 minutes or until clear; cool to 70° C. (where necessary); add the caustic soda and fluidifiers, furfuryl alcohol (when used) and the paraformaldehyde; heat to 110° C.-120° C. for 20 to 30 minutes or until clear; add the capric acid (when used); heat to 115° C. -120° C. for about 10 minutes; cool, add the modifying agent (when used), and discharge the reactor.

Representative examples of formulations used for preparing the liquid formaldehyde hardener (H) are set forth in Table II below.

TABLE II

| | Formaldehyde Hardener (H) | | | | | | | | | | | | | | | |
|---|---|---|---|---|---|---|---|---|---|---|---|---|---|---|---|---|
| | Percent by Weight (%) | | | | | | | | | | | | | | | |
| Formulation No. (H-) | 1 | 2 | 3 | 4 | 5 | 6 | 7 | 8 | 9 | 10 | 11 | 12 | 13 | 14 | 15 | 16 |
| Components: | | | | | | | | | | | | | | | | |
| Paraformaldehyde | 16 | 24.0 | 27.0 | 21.9 | 24.4 | 25.4 | 26.2 | 25.8 | 25.8 | 35.3 | 30.7 | 40.1 | 25.4 | 23.8 | 24.4 | 26.9 |
| Furfuryl alcohol | 84 | 57.0 | 49.0 | 24.2 | 12.7 | 9.8 | 5.4 | — | — | 22.4 | 6.0 | — | — | — | 5.1 | — |
| Urea | — | 15.9 | 20.0 | 22.7 | 27.8 | 29.2 | 30.4 | 30.6 | 30.6 | 38.2 | 39.6 | 46.6 | 29.5 | 27.6 | 28.3 | 29.8 |
| Glucose | — | — | — | 27.3 | 29.0 | 29.4 | 30.4 | 30.6 | 30.6 | — | 19.7 | — | 29.5 | 40.7 | 35.1 | 35.7 |
| Cyclohexanol | — | — | — | — | — | — | — | 2.3 | — | — | — | — | — | — | — | — |
| Glycerol | — | — | — | — | — | — | — | — | 2.3 | — | — | — | — | — | — | — |
| Diethylene glycol | — | — | — | — | — | — | — | 3.1 | — | — | — | — | — | — | — | — |
| Hexylene glycol | — | — | — | — | — | — | — | — | 3.1 | — | — | — | — | — | — | — |
| Sodium hydroxide (3% soln.) | — | 1.4 | 1.2 | 1.2 | 2.5 | 2.6 | 3.6 | 3.6 | 3.6 | 2.9 | 2.3 | 3.4 | 3.5 | 3.3 | 3.4 | 3.8 |
| Water | — | 1.0 | 2.1 | 2.7 | 3.6 | 3.6 | 4.0 | 4.0 | 4.0 | 1.0 | 1.5 | 9.6 | 12.1 | 4.6 | 3.7 | 3.8 |
| Capric acid | — | 0.7 | 0.7 | — | — | — | — | — | — | 0.2 | 0.2 | 0.3 | — | — | — | — |

Any suitable modifying agent can be used in conjunction with the resin former and hardener to prepare the reaction product therebetween, so long as the modifying agent or agents is compatible with the gradual hardening of the reaction product at ambient or slightly elevated temperature, and further provided that the reaction product therebetween is characterized by a permanent low temperature intumescence even after prolonged storage to form a voluminous thermal insulating low density foam barrier. The preferred modifying agents are monethanolamine, diethylamine, morpholine and the like. The modifying agent is used in an amount of about 0.005-4, usually about 0.02-4, parts by weight per 1 part of the combined weight of liquid resin former and liquid hardener. Preferably about 1 or 2 parts of the modifying agent are used.

By way of example, the modifying agent can be added, according to one procedure by charging the reaction vessel with a hardener, charging the modifying agents, stirring until mixed, charging the resin former, stirring until mixed, and allowing the hardening action to proceed. The modifying agents surprisingly impart a permanence of the low temperature intumescence of the resultant coating compositions even after prolonged storage of the flameproof and fireproof products and are essential to the invention.

Composite panels using polystyrene beads, a coating composition embodying the present invention and containing monoethanolamine as a modifying agent showed a megligible elevation of initial or incipient low intumescence temperature when exposed to flame and heat after 30 months storage, whereas such panels coated with the same coating free of a modifying agent showed a significant elevation of initial or incipient low intumescence temperature when exposed to flame and heat after 30 months storage.

It is believed that the modifying agents influence the reaction product to retain the coating material in a thermoplastic instead of a thermosetting state generally experienced by reactions of this sort, the latter state being incongruous with the desired intumescent action of the coating material.

The flameproof and fireproof characteristics of the product of the present invention can be further improved when the resin former contains from about 2% to about 30% by weight thereof of at least one supplemental gas generating additive or blowing agent, such as, urea, ammonium phosphate, ammonium sulfate, oxalic acid; dicyandiamide and like compounds or mixtures thereof. These additives are generally heat-degradable and gas-liberating at a low temperature of from about 80° C. to about 120° C. when in the presence of the coating material to liberate a gas, such as ammonia, carbon dioxide or water vapor.

The coating material can also contain compatible additives, when desired, such as fillers, e.g., diatomaceous earth; vermiculite; inorganic or organic fine particles and microspheres which may be heat-expandable; colorants; water repellents; powdered metal or metallic oxides (e.g., $MgO$, $Al_2O_3$) and the like.

For conditions, where water resistance is desired or required, the ingredients of the coating material or the additive may be selected for this purpose, and still provide the desired flameproofing or fireproofing characteristics with the accompanying increased intumescence. For example, it has been found that resorcinol in the coating material adds to the water-insoluble properties of the coating material. Also, lower phosphoric acid content is beneficial to water-insolubility, but sufficient phosphoric acid must be present in an amount to produce the desired coating material.

The coating material is prepared by blending together the liquid resin former with the liquid hardener and modifying agent at ambient temperature or at a slightly elevated temperature, e.g., 38° C., if necessary to lower the viscosity of the blend and thereby facilitate blending. The optional and preferred supplemental gas generating additives can be dissolved and/or dispersed in the liquid resin former or added before, during or after the liquid resin former has been blended together with the liquid hardener therefor.

The coating material may be applied to the fire-unstable material by any suitable coating method, such as, spray coating, dip or immersion coating, roll coating or the like, at room temperature or higher.

If the fire-unstable material is in the form of a sheet or strata, it may be coated on one or both sides, and if desired, may be provided with a facing material, which preferably is also a flameproof material. A fireproof structural element in the form of a panel may also be produced by laminating a plurality of layers or strata of fire-unstable material with some or all strata having a film of the fireproof intumescent coating material. Many of the coating materials embodying the present invention have adhesive properties to securely adhere together the layers into a laminated structure. When adhesives are used in addition to the coating material, they are preferably at least fire-retarding so that they do not detract from the flameproof and fireproof properties of the laminated panel. If desired, the layers or strata may be laminated in the presence of heat which may also serve to cure the coating material.

In the case of particles of fire-unstable material, such as, thermoplastic particles, polystyrene beads, expandable polystyrene beads, or partially expanded expandable polystyrene beads, the particles may be mixed with the coating material and formed into a sheet or panel, desirably in a suitable mold. The mold may then be heated to cure the coating material and in the case of expandable polystyrene the heat may also fuse or agglomerate the polystyrene particles into a soild mass.

Suitable heat methods are convection or radiation using various sources of heat. Electronic heating is a desirable method. RF molding is a known form of heat used in the molding of polystyrene foam panels and may employ di-electric or radio frequency currents at low or high frequencies. Heat from a microwave oven is also an available method for producing useful sheets or panels containing both the fire-unstable material and fireproof coating material. In the case of expandable or partially expandable polystyrene particles which have been mixed with a flameproof coating material, the combination may be molded into a panel in a suitable mold by steam or hot air. The heat will cause the polystyrene particles to fuse together, and may, in addition, cause a chemical reaction in the coating material, such as, curing thereof.

As used in the present invention, RF heating is advantageous because the coating materials embodying the present invention have a high power loss factor and may be rapidly cured, together with provision of the adhesive action between the fireproof coating material and the fire-unstable material. When the coating material is mixed with expandable or partially expanded polystyrene particles and heated in a panel mold, the RF heat cures the coating material, adheres it to the polystyrene particles, and, in addition, causes fusing or agglomeration of the polystyrene particles into a structural board or panel having good strength and insulating properties, together with the desired fireproof and flameproof properties. If required or desired, the coating material may be slightly varied to achieve the desired response to the electronic current involved.

The flameproof and fireproof products of the invention prepared in accordance with the above procedures will be further illustrated by representative examples thereof set forth below.

EXAMPLE 1

In a modified Bureau of Mines Burn Through Test on DYLITE M-57A expanded polystyrene, a $12'' \times 12'' \times 1''$ composite molded sample [See Footnote (a) in Table IV hereinafter] was supported, on a tripod; the sample was 2" over the tip of a Fisher Burner. The flame of the Fisher Burner was adjusted to $4\frac{1}{2}''$ height with a $1\frac{1}{2}''$ inner cone. A Kem-Wipe was placed on the top of the sample which was then placed over the flame. Burn through time was indicated by ignition of the Kem-Wipe. A five minute (300 seconds) maximum exposure time was adopted.

The data generated from this test are presented in Table III below.

TABLE III

Modified Bureau of Mines Burn Through Test

| Run No. | Resin Former (RF) | Hardener (H) | Weight Ratio of RF/H | Weight Ratio of Coating Material/DYLITE | Time to Burn Through (Sec.) | Comment |
|---|---|---|---|---|---|---|
| Control | Nil | Nil | Nil | Nil | 5 | M-57A; 1.0 pcf Density |
| 1 | RF-2 | H-6 | 1/2 | 2/1 | 300 | No burn through |
| 2 | RF-2 | H-6 | 1/1 | 2/1 | 300 | No burn through |
| 3 | RF-2 | H-6 | 1/1 | 1/1 | 65 | — |
| 4 | RF-2 | H-6 | 1/2 | 2/1 | 300 | Faced with Aluminum Foil - no burn through |
| 5 | RF-2 | H-6 | 1/2 | 2/1 | 300 | DYLITE was regular grade - no burn through |
| 6 | RF-2 | H-15 | 1/1 | 2/1 | 300 | No burn through |
| 7 | RF-2 | H-9 | 1/2 | 1/1 | 60 | — |

NOTE:
All runs contained 2% monoethanolamine based on total weight of resin and hardener.

All of the above tests were with molded composites. Specially prepared laminates, one inch thick, two-ply (made from polystyrene prepuff molded and fused and then coated so that the coating material serves as a binder between the two plies and as an outer surface coating), performed well, also, with no burn through in 300 seconds in the test.

From the data set forth the Table III above, it will be noted that the composite molded sample of polystyrene beads without any hardened coating material thereon (Control Run) had a low Burn Through Time of only 5 seconds as contrasted with Runs Nos. 1-7 of the invention wherein the composite molded sample of polystyrene beads containing a variety of hardened coating material thereon had appreciably higher Burn Through Times ranging from 65 seconds to 300 seconds. Since 300 seconds was the maximum exposure time of the tests, there was no burn through at all for Runs 1, 2 and 4-6.

EXAMPLE 2

In this example, the standard Coast Guard Flammability Test was run on DYLITE M-57A and F-64A expanded polystyrene (EPS) in the form of composite molded samples [See Footnote (a) in Table IV below] with the test results being set forth in Table IV.

TABLE IV

Coast Guard Flammability Test

| Run No. | 1 | 2 | 3 | 4 | 5 | 6 | 7 |
|---|---|---|---|---|---|---|---|
| Coating Material: | | | | | | | |
| Resin Former | RF-2 | RF-2 | RF-2 | RF-2 | RF-2 | RF-2 | RF-2 |
| Hardener | H-9 | H-6 | H-6 | H-6 | H-6 | H-6 | H-6 |
| Monoethanolamine; % | 2 | 2 | 2 | 2 | 2 | 2 | 2 |
| Weight Ratio: | | | | | | | |
| Resin Former/Hardener | 1/2 | 1/1 | 1/2 | 1/2 | 1/2 | 1/2 | 1/2 |
| DYLITE EPS; Type | M-57A | M-57A | M-57A | M-57A | M-57A | M-57A | F-64A |
| Weight Ratio: | | | | | | | |
| Coating Material/DYLITE[a] | 1/1 | 2/1 | 2/1 | 1/1 | 2/1 | 2/1 | 2/1 |
| Other | — | — | — | — | Faced with 2-3 Mil EPS Foam Sheet | Faced with Heat-Sealable Aluminum Foil | — |
| Avg. Density; pcf | 1.84 | 2.90 | 3.08 | 2.05 | 3.26 | 3.60 | 2.97 |
| Avg. Deviation, ± pcf | 0.02 | 0.06 | 0.07 | 0.11 | 0.04 | 0.06 | 0.10 |
| Coast Guard Flammability[b] | | | | | | | |
| Avg. Ignition Time (sec.) | 143 | 128 | 600 | 600 | 600 | 600 | 243 |
| Avg. Ignition Temp. (°C.) | 456 | 469 | — | — | — | — | 455 |
| Samples Ignited/5 Samples Tested | 4 | 2 | 0 | 0 | 0 | 0 | 3 |
| Temperature °C. at Test End for Samples that did Not Ignite: | 510 | 514 | 440 | 426 | 460 | 460 | 470 |

FOOTNOTES:
[a] Molded part preparation; the resin former and hardener are mixed well together; the resulting coating material is added to DYLITE prepuff under agitation by electric mixer; composite is charged to mold; dry heat molding program is 3-5 minutes at 104° C.-121° C.; cool is 5 minutes.
[b] Maximum test time = 10 min. (600 seconds)

In a Control Run on 1.0 pcf DYLITE beadboard without any coating material on the expanded polystyrene beads, the beadboard ignited at a low ignition temperature of about 402° C.; whereas in Runs 1-7 (5 samples per run) of the invention, most of the expanded polystyrene beadboards did not ignite at all (26 out of 35 total samples) even though the temperature at the end of the 600 seconds test time ranged from 426° C. to 514° C. Moreover the 9 other samples in Runs 1-7 which did ignite had an average ignition temperature appreciably higher than the 402° C. ignition temperature for the control sample, namely 455° C. to 469° C.

EXAMPLE 3

In this example, composite molded expanded polystyrene beadboard was tested in the standard Underwriter's Laboratories Tunnel Test UL 723 with the results being set forth in Table V below. The expanded polystyrene was DYLITE M-57A having a nominal 1.0 pcf density. The resin former (RF) and hardern (H) were blended together to form the coating material (except in Control Run 7) which was then added to the prepuff; blended in Hobart Mixer; and molded in wood molds to form 4" thick panels. Each of the coating materials below further contained 2% monoethanolamine and 3-5% methanol. In Run 6 the beadboard had an aluminum foil skin.

TABLE V

| | UL Tunnel Test | | | | | | |
|---|---|---|---|---|---|---|---|
| Run. No. | 1 | 2 | 3 | 4 | 5 | 6 | 7 (Control) |
| Resin Former | RF-2 | RF-2 | RF-77 | RF-2 | RF-77 | RF-2 | None |
| Hardener | H-6 | H-6 | H-15 | H-9 | H-15 | H-6 | None |
| Weight Ratio: RF/H | 1/1 | 1/2 | 1/1 | 1/2 | 1/1 | 1/1 | — |
| Weight Ratio: Coating Material/ DYLITE | 2/1 | 2/1 | 2/1 | 2/1 | 2/1 | 2/1 | — |
| Finished Panels; Density; pcf | 3.56 | 3.43 | 3.91 | 3.34 | 3.17 | 3.72 | 1.00 |
| UL Tunnel Test: Flame Spread | 43.6 | 30.8 | 23.1 | 53.6 | 38.5 | 43.6 | 15 |
| Fuel Contributed | 12.5 | 0 | 0 | 5.6 | 0 | 9.0 | 33.6 |
| Smoke Developed | 165 | 210 | 53.4 | 362 | 67.2 | 323 | 845–1150 |

From the data in the above Table V for Run Nos. 1–6 of the invention versus Control Run 7, it is apparent that the products of the invention have a low fuel contribution and low smoke development. It is important to note that during the test, with the exception of the control sample, the material remained in place on the ceiling of the tunnel with no evidence of dripping and subsequent ignition of melted polymer on the floor of the tunnel as usually experienced with the control sample. Further, over 50% of each sample survived or endured the test, whereas in the case of the control sample, 90% to 100% of the sample was consumed. This is more remarkable when it is realized that the standard test procedure provides for a 10 minute test in Table V.

EXAMPLE 4

In this example, the above Modified Bureau of Mines Burn Through Test and the above Coast Guard Flammability Test were run on laminates prepared from ½" thick polyurethane foam, both with (Run 1) and without (Run 2) a Kraft paper interlayer, using a coating material prepared from a resin former (RF-2) and a hardener (H-15) in a 1:1 weight ratio plus a modifying agent in the amount of 2% monoethanolamine applied at 50 grams per square ft. loading and compared with a Control Run without the coating material. The test results are given in Table VI below.

TABLE VI

| Run No. | Control | 1 | 2 |
|---|---|---|---|
| Modified Bureau of Mines Burn Through Test; Time to Burn Through (sec.) | 10 | 300 | 300 |
| Comment | — | No burn through | No burn through |
| Coast Guard Flammability Test: | | | |
| Avg. Ignition Time (sec.) | 47 | 292 | 372 |

TABLE VI-continued

| Run No. | Control | 1 | 2 |
|---|---|---|---|
| Avg. Ignition Temp. (°C.) | 418 | 491 | 450 |
| Samples Ignitied/5 Samples Tested | 5 | 2 | 2 |
| Temperature °C. at Test End for Samples that did Not Ignite | — | 478 | 460 |

From the data set forth in Table VI above, it will be noted that the polyurethane foam without any hardened coating material thereon (Control Run) has a low burn through time in the Modified Bureau of Mines Burn Through Test of only 10 seconds as contrasted with Runs 1 and 2 of the invention wherein the polyurethane foam having a hardened coating material thereon had no burn through at the end of the 300 seconds maximum exposure time. In the Coast Guard Flammability Test, all five samples in the Control Run on polyurethane foam without a hardened coating material thereon ignited at a low ignition temperature of 418° C. at the end of only 47 seconds. In contrast therewith, in Runs 1 and 2 of the invention wherein the polyurethane foam was coated with the coating material, 6 out of the 10 total samples did not ignite at all even though the temperature at the end of the 600 seconds test time ranged from 460° C. to 478° C. Moreover, the 4 other samples in Runs 1 and 2 which did ignite had an average ignition temperature appreciably higher than the 418° C. ignition temperature for the control sample, namely 450° C. to 491° C.

EXAMPLE 5

Samples of common plywood were coated with one of three different commercially available intumescent paints or with a typical coating material of the invention and exposed to a Fisher Burner flame for 1 minute. The results of the open flame tests are set forth in Table VII below.

TABLE VII

| | Coating | Open Flame Testing | | | |
|---|---|---|---|---|---|
| Type | Concentration (gms./ft.²) | Char Formed | Intumescence Occur | Depth | Wood Ignited |
| Firetect WT-102 | 25 | Yes | Yes | <1/16" | Yes |
| Firetect PC-210 | 16 | No | No | — | Yes |
| Ball Chem. G-3232 | 16 | Yes | Yes | ¼" | No |
| Coating Material (Wt. Ratio of RF-2/H-6 = 1/1) 2% monoethanolamine | 30 | Yes | Yes | 1¼" | No |

The marked superiority of the coating materials of the invention over the commercially available intumescent paints is quite apparent from the comparative data given in the above Table VII.

EXAMPLE 6

In another experiment, an extruded polyethylene foam sheet having a latice geometry was coated with the coating material embodying the present invention and air dried. Upon exposure to flame the coating intumesced closing the latice openings and averted polymer degradation and subsequent ignition. Upon removal of the intumescent char the polyethylene was found to be substantially intact.

The following two examples present comparative data on the moisture resistance of composite moldings (Example 7) and laminates (Example 8) of the invention

EXAMPLE 7

Coating materials formed of RF-2 and H-6 at a weight ratio of 1:2 were prepared with the addition of 10% methanol and 2% monoethanolamine. These were mixed with expandable polystyrene particles in weight ratios of coating material to beads of 3:1, 2:1, and 1:1, and were molded into cylinders approximately 4 inches in diameter and 10 inches long. The moldings were exposed to an RF high frequency current for a period of 10 seconds producing moldings with excellent fusion and completely dry. One sample was exposed to microwave heat.

The samples were placed in an enclosure having relative humidity in excess of 80%. All of the samples were exposed to this high humidity for a period of 1,000 hours. Upon examination during and after this exposure, there was no evidence of any disassociation of the samples, or that the humidity had any adverse effect on them except for a slight surface tackiness.

Control samples after being heated in a circulating air oven, survived the exposure to the high humidity for a period of 24 hours, but had disassociated or crumbled at the end of 96 hours.

EXAMPLE 8

Samples of two-ply laminates of one inch bead board were laminated together with a ply of kraft paper therebetween, with a coating material on either side of the kraft paper.

The coating material employed was formed of RF-2 and H-15 in a weight ratio of 1:2 with the addition of 0.5% of monoethanolamine.

One set of samples was cured at room temperature for one week and upon exposure to the high humidity enclosure they showed signs of partial delamination after 72 hours and after 144 hours were completely delaminated.

Some of the samples were cured in a hot air circulating oven for 8 hours at 150° C. and were then air cured for one week. After 72 hours exposure to the high humidity test they showed partial delamination.

Additional samples were cured in a microwave oven at a 10 second exposure, and after 144 hours in the relatively high humidity showed no signs of delamination.

Similar laminates using a coating material formed of RF-2 and H-6, some with the addition of 0.5% monoethanolamine and 10% methanol and some with 2% monoethanolamine and 10% methanol, were allowed to stand at ambient temperature. Upon exposure to the high humidity they were completely delaminated at the end of 48 hours.

As noted above, the coating material of the invention shows a start of intumescence at low temperatures of 75° C. to 150° C., which are much lower than the temperature or temperature range when the fire-unstable material starts to give off volatiles or loses dimensional stability. On the other hand, the prior art fire-retardant intumescent coatings show a start of intumescence at higher temperatures of 160° C.–260° C. The early start of intumescence may be the factor that allows the coating material of the invention to provide an insulating foam barrier that keeps the fire-unstable material from burning. This property is particularly of great importance for use of the coating material with expandable polystyrene. Moreover, the presence of a modifying agent ensures a permanence of the low temperature intumescence of the resultant coating compositions even after prolonged storage of the flameproof and fireproof products.

What is claimed is:

1. A flameproof and fireproof product which consists essentially of
   (a) a fire-unstable material, and
   (b) a coating composition which comprises a resinous reaction product of phosphoric acid and a reducing sugar, a hardener, and at least one modifying agent capable of rendering said coating composition highly and permanently intumescent at a low initiating temperature even after prolonged storage of said product, said modifying agent being selected from the group consisting of monoethanolamine, diethylamine and morpholine;
   whereby when said coating composition is exposed to heat or flame, said coating composition copiously intumesces to form a thermal insulating foam barrier for said fire-unstable material, said thermal insulating foam barrier upon continued exposure to heat or flame for an appreciable time becoming a porous char or residue protecting said fire-unstable material, said char or residue being nonflammable, having adequate insulation strength and flame resistance to prevent degradation of said fire-unstable material.

2. The flameproof and fireproof product as defined by claim 1 wherein said coating composition has an initiating temperature of from about 75° C. to about 150° C.

3. The flameproof and fireproof product as defined by claim 1 wherein said coating composition further contains at least one supplemental gas generating additive.

4. The flameproof and fireproof product as defined by claim 1 wherein said thermal insulating foam barrier has a foam density of from about 0.2 to about 2 pounds per cubic foot.

5. The flameproof and fireproof product as defined by claim 1 wherein the weight ratio of said coating composition to said fire-unstable material is from about 0.04:1 to about 4:1.

6. The flameproof and fireproof product as defined by claim 1 wherein said fire-unstable material is a polymeric composition.

7. The flameproof and fireproof product as defined by claim 1 wherein said fire-unstable material is a polystyrene composition.

8. The flameproof and fireproof product as defined by claim 1 wherein the initiating temperature of said coating composition is below the melting point of said fire-unstable material.

9. The flameproof and fireproof product as defined by claim 1 wherein said fire-unstable material is foamed polystyrene.

10. The flameproof and fireproof product as defined by claim 1 wherein said fire-unstable material is expanded polystyrene having a four inch thickness and when subjected to Underwriter's Laboratories Tunnel Test UL 723 achieved a flame spread rating of under about 54 and an average smoke developed rating of under about 400.

11. The flameproof and fireproof product as defined by claim 1 wherein said coating composition comprises the resinous reaction product of
(a) from about 1 part to 10 parts by weight of a resin former with
(b) from about 10 parts to about 1 part by weight, respectively, of a hardener, and containing
(c) from about 0.005 to about 4 parts by weight of said modifying agent per 1 part of the combined weight of resin former and hardener; said resin former comprising the liquid polymeric product of a mixture of
(a$_1$) from about 25% to about 80% by weight of a reducing sugar,
(a$_2$) from about 5% to about 62% by weight of 85% strength phosphoric acid,
(a$_3$) from about 2% to about 20% by weight of at least one fluidifier selected from the group consisting of water and dihydric and polyhdric lower aliphatic alcohols, and
(a$_4$) from 0% to about 15% by weight of a polyhydric phenol having at least two hydroxy groups in a meta position selected from the group consisting of resorcinol, pyrogallol and phloroglucinol.

12. The flameproof and fireproof product as defined by claim 11 wherein said coating composition further contains from about 2% to about 30% by weight of the resin former of at least one supplemental gas generating additive which is heat-degradable and gas liberating at a temperature of from about 80° C. to about 120° C. when in the presence of said coating composition.

13. The flameproof and fireproof product as defined by claim 12 wherein said supplemental gas generating additive is selected from the group consisting of urea, ammonium phosphate, ammonium sulfate, oxalic acid, and dicyandiamide.

14. The flameproof and fireproof product as defined by claim 11 wherein the amount of said modifying agent is from about 0.02 to about 4 parts by weight thereof per 1 part of the combined weight of resin former and hardener.

15. The flameproof and fireproof product as defined by claim 11 wherein the amount of said modifying agent is about 1 part by weight thereof per 1 part of the combined weight of resin former and hardener.

16. The flameproof and fireproof product as defined by claim 11 wherein the amount of said modifying agent is about 2 parts by weight thereof per 1 part of the combined weight of resin former and hardener.

17. The flameproof and fireproof product as defined by claim 11 wherein said hardener contains formaldehyde.

18. The flameproof and fireproof product as defined by claim 11 wherein said hardener contains formaldehyde and furfuryl alcohol.

19. The flameproof and fireproof product as defined by claim 11 wherein said hardener contains formaldehyde and urea in a mole ratio of formaldehyde to urea of from about 1:1 to about 2:1

20. The flameproof and fireproof product as defined by claim 11 wherein said hardener contains formaldehyde, urea and furfuryl alcohol.

21. The flameproof and fireproof product as defined by claim 11 wherein the hardener contains formaldehyde, urea and glucose; the mole ratio of urea to glucose being from about 6:1 to about 2:1

22. The flameproof and fireproof product as defined by claim 11 wherein the weight ratio of said coating composition to said fire-unstable material is from about 0.4:1 to 2:1

23. The flameproof and fireproof product as defined by claim 11 wherein said resinous reaction product is from about 1 part to about 6 parts by weight of said resin former with about 2 parts to about 1 part by weight, respectively, of said hardener.

24. The flameproof and fireproof product as defined by claim 11 wherein said fire-unstable material is selected from the group consisting of polystyrene foam, polyethylene foam, polyurethane foam, wood particles, glass fibers and cork.

25. A process of making a flameproof and fireproof product which comprises
(a) making a coating composition which comprises a resinous reaction product of phosphoric acid and a reducing sugar, a hardener, and at least one modifying agent capable of rendering said coating composition highly and permanently intumescent at a low initiating temperature even after prolonged storage of said product, said modifying agent being selected from the group consisting of monoethanolamine, diethylamine and morpholine; and
(b) applying said coating composition to a fire-unstable material;
whereby when said coating composition is exposed to heat or flame, said coating composition copiously intumesces to form a thermal insulating foam barrier for said fire-unstable material, said thermal insulating foam barrier upon continued exposure to heat or flame for an appreciable time becoming a porous char or residue protecting said fire-unstable material, said char or residue being nonflammable, having adequate insulation strength and flame resistance to prevent degradation of said fire-unstable material.

26. The process as defined by claim 25 wherein said coating composition further contains at least one supplemental gas generating additive.

27. The process as defined by claim 25 wherein said fire-unstable material is a polymeric composition.

28. The process as defined by claim 25 wherein said fire-unstable material is foamed polystyrene.

* * * * *